United States Patent [19]

Lee

[11] Patent Number: 5,418,895

[45] Date of Patent: May 23, 1995

[54] METHOD FOR DISPLAYING A HIGH QUALITY DIGITAL COLOR IMAGE ON A LIMITED COLOR DISPLAY

[75] Inventor: Hsien-Che Lee, Penfield, N.Y.

[73] Assignee: Eastman Kodak Company, Rochester, N.Y.

[21] Appl. No.: 981,721

[22] Filed: Nov. 25, 1992

[51] Int. Cl.⁶ .............................................. G06T 5/40
[52] U.S. Cl. ...................... 395/131; 382/168; 345/150
[58] Field of Search ............. 395/131; 382/17, 18; 345/150

[56] References Cited

U.S. PATENT DOCUMENTS

| | | | |
|---|---|---|---|
| 4,823,120 | 4/1989 | Thompson et al. | 340/703 |
| 4,905,164 | 2/1990 | Chandler et al. | 395/131 |
| 4,985,853 | 1/1991 | Taylor | 364/521 |
| 5,016,191 | 5/1991 | Radochonski | 364/518 |
| 5,048,095 | 9/1991 | Bhanu et al. | 382/9 |
| 5,049,986 | 9/1991 | Aono et al. | 358/80 |
| 5,065,144 | 11/1991 | Edelson et al. | 340/703 |
| 5,068,644 | 11/1991 | Batson et al. | 340/701 |
| 5,083,257 | 1/1992 | Kennedy | 395/131 |
| 5,295,202 | 3/1994 | Steinkirchner et al. | 382/17 X |
| 5,365,252 | 11/1994 | Lo | 345/150 X |

OTHER PUBLICATIONS

Claris MacDraw Pro, Color Guide, 1991, pp. 2-8 through 2-27.
"Color Magic from Kodak", Brochure for Kodak Designmaster 8000, 1989.

*Primary Examiner*—Mark K. Zimmerman
*Attorney, Agent, or Firm*—Edward Dugas

[57] ABSTRACT

Instead of trying to minimize some cost function of color errors, the present invention exploits physical models of scene-image relations. An image is first segmented into regions corresponding to objects in the physical world. Each object is then painted with a few levels of shades of the same chromaticity. This is motivated by the observation that physical objects are the basic units for human visual perception. Chromatic variations within an object surface tend to be grossly discounted by our color vision, and therefore, it is not necessary to render those variations accurately. Furthermore, since the shading across an object surface spans a much smaller dynamic range as compared to the whole scene, the limited number of color shades can be more effectively used within a segmented image region.

14 Claims, 4 Drawing Sheets

METHOD FOR DISPLAYING A HIGH QUALITY DIGITAL COLOR IMAGE ON A LIMITED COLOR DISPLAY

A portion of the disclosure of this patent document contains material which is subject to copyright protection. The owner has no objection to the facsimile reproduction by anyone of the patent disclosure, as it appears in the Patent and Trademark Office patent files or records, but otherwise reserves all rights whatsoever.

FIELD OF THE INVENTION

The present invention is related to the field of image rendering and more particularly to the use of a luminance-chrominance histogram for image segmentation wherein each image segment is allocated a number of colors according to its size, busyness, and dynamic range.

BACKGROUND OF THE INVENTION

The trichromatic nature of human color vision requires three color primaries for reproducing color images. In the digital image processing art it usually takes 8 to 10 bits per color to render a high quality color image. However, there are many low-cost color monitors which have only 8-bit frame buffers. Although they have 8 or 10-bit digital-to-analog converters for the red, green, blue electron guns, and, given proper calibration, are capable of showing $2^{24}$ or $2^{30}$ colors, their frame buffers can only accommodate 8-bits per pixel thereby limiting the number of possible displayable colors at a given frame to $2^8=256$. With the help of a colormap lookup table (256 entries, each 24-bit deep), these 256 colors can be chosen from any of the $2^{24}$ possible colors. The problem is how to choose the appropriate 256 colors to render a color image with the least objectionable artifacts. A number of methods have been proposed to solve the problem of 24-to-8-bit color reduction. These methods have been designed with explicit goals to minimize certain cost functions of colorimetric errors based on the statistical distribution of the colors in the input image.

The median-cut, the mean-cut, and the variance-based algorithms are typical examples of such error-minimization methods. The median-cut and the mean-cut algorithms were described by P. Heckbert, "Color image quantization for the frame buffer display," Computer Graphics, 16, 3, 297–307, 1982. The variance-based algorithm was described by S. J. Wan, P. Prusinkiewicz, and S. K. M. Wong, "Variance-based color image quantization for frame buffer display," COLOR research and application, 15, 1, 52–58, 1990. The basic idea behind all the three existing methods is to recursively partition the RGB color histogram into smaller and smaller sub-boxes so that each of the final 256 sub-boxes can be represented by its mean color without large errors. The three methods differ in how the sub-boxes are selected and partitioned. The median-cut and the mean-cut methods select the sub-box that has the largest dynamic range for further partitioning. The mean-cut algorithm partitions it at the mean value and the median-cut at the median value. In comparison, the variance-based method selects the sub-box that has the largest variance for further partitioning, and it partitions the sub-box at the point that produces the minimum sum of the variances of the resulting two smaller boxes.

Another variation of the above method is to form the color histogram in the "uniform" color space, such as CIELAB or CIELUV, so that the human perceptual error, rather than camera sensor error, is minimized. This was described by R. S. Gentile, J. P. Allebach, and E. Walowit, "Quantization of color images based on uniform color spaces," Journal of Imaging Technology, 16, 1, 11–21, 1990.

Although the idea of minimizing color errors seems to be intuitively sound, the above mentioned solutions overlook the following empirical findings that can improve the color rendition even further: The world consists of separate objects whose surfaces reflect light in a way that could be approximated by some reflection models. The human visual system does not perceive the world as unrelated color patches that happen to fit into an image. Instead, it insists on interpreting the image as consisting of objects reflecting different color light. The consequence of this persistent cognitive interpretation is the tendency for us to ignore the color variations within an object surface and to emphasize those between different objects. Color errors are more difficult to see in a busy area than in a uniform area. The large dynamic range of a color scene is mainly due to illumination variations from one part of the scene to another. Luminance range across a surface is usually much smaller except when there is a shadow. Rendering an image region of an object surface thus requires much fewer levels of shades.

A patent of interest for its teaching is U.S. Pat. No. 4,907,075 entitled "Method for Selecting Colors" by G. W. Braudaway wherein an RGB histogram is formed and the most populated cell is selected as the representation color. The method then reduces the neighboring cell counts by an exponential function before it picks the next representation color. Another patent of interest is U.S. Pat. No. 5,049,986 entitled "Method And Apparatus For Color Image Quantization" by M. Aono et al. This patent relates to a data structure that allows a fast implementation of an algorithm similar to the one disclosed in the previous patent, U.S. Pat. No. 4,907,075.

SUMMARY OF THE INVENTION

Instead of trying to minimize some cost function of color errors, the present invention exploits physical models of scene-image relations. An image is first segmented into regions corresponding to objects in the physical world. Each object is then painted with a few levels of shades of the same chromaticity. This is motivated by the observation that physical objects are the basic units for human visual perception. Chromatic variations within an object surface tend to be grossly discounted by our color vision, and therefore, it is not necessary to render those variations accurately. Furthermore, since the shading across an object surface spans a much smaller dynamic range as compared to the whole scene, the limited number of color shades can be more effectively used within a segmented image region.

Two major components of the present method are a physics-based image segmentation algorithm and a psychophysics-based coloring algorithm. Based on models of light reflection, the image segmentation algorithm partitions the input image into regions that roughly correspond to different physical objects. The coloring algorithm renders the busy image regions with fewer luminance levels than the uniform image areas where shadings are subtle and errors easily visible. Many images rendered in 8-bits by this method have been compared with those rendered by other methods, such as the median-cut, the mean-cut, and the variance-based algorithms. The rendition by the present invention is shown to have the least contouring artifacts. Its good performance is consistent with the psychophysical finding that color is filled in to an image region from edges.

From the foregoing it can be seen that it is a primary object of the present invention to provide an improved method for displaying color images, particularly adapted for low-cost monitors.

A further object of the present invention is to provide a means for achieving a much improved rendition of color images using a few number of bits.

Another object of the present invention is to provide a technique for solving the 24-to-8-bit color reduction of an image.

These and other objects of the present invention will become more apparent when taken in conjunction with the following description and drawings wherein like characters indicate like parts and which drawings form a part of the present description.

DESCRIPTION OF THE PREFERRED EMBODIMENTS

Figure 1:
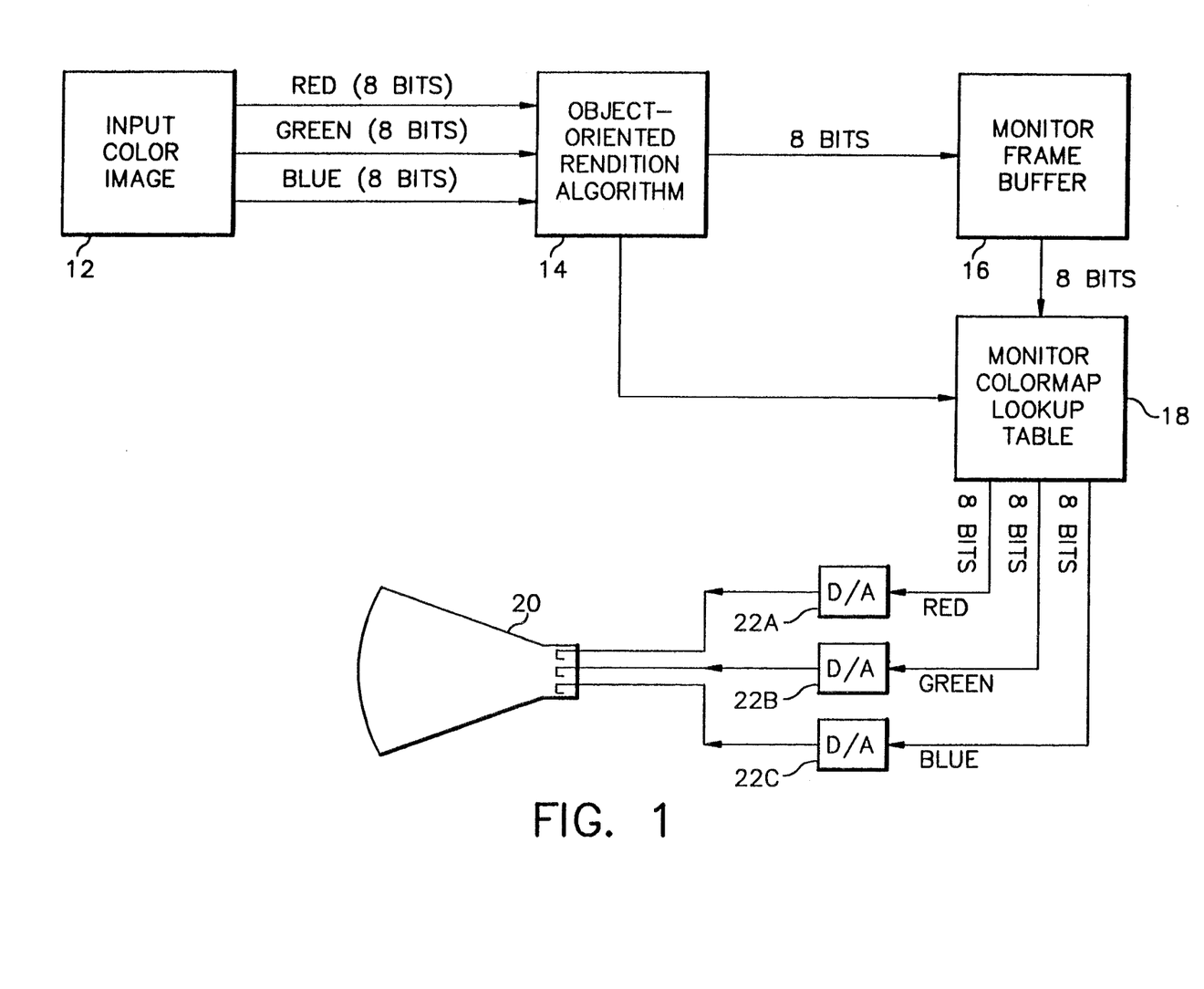
FIG. 1 illustrates, in block diagram form, an apparatus for implementing the present invention.

FIG. 1 illustrates a system implementation of the present invention incorporating the object-oriented rendition algorithm, which can be used for displaying color images on a low-cost color monitor. An input color image 12 is digitized by any well known technique to provide red, green and blue signals each having a depth of 8 bits and representing a pixel of the original image. The three 8-bit code values are operated upon by an object-oriented rendition algorithm 14 which provides as outputs an 8-bit output to a monitor frame buffer 16 and an image-dependent lookup table that has 256 entries, each of which is 24-bits deep. The image-dependent lookup table is loaded into the monitor colormap lookup table 18 which is used to map the 8-bit code value of a pixel from the monitor frame buffer 16 into a 24-bit output value. The 24-bit output of the monitor colormap lookup table 18 is comprised of the red, green, and blue signals, each 8-bits in depth. These signals are converted from digital form to analog form by the D/A converters 22A, 22B and 22C and are directed to the control electrodes of a CRT color monitor 20. The 8-bit code value of a pixel in the monitor frame buffer 16 is used as an index to the colormap lookup table 18 to retrieve the 24-bit information that determines the color of the pixel displayed by the monitor 20. The 24-bit output from the monitor colormap lookup table 18 is divided into the three 8-bit signals that are converted to the analog voltages for driving the monitor 20.

Figure 2:
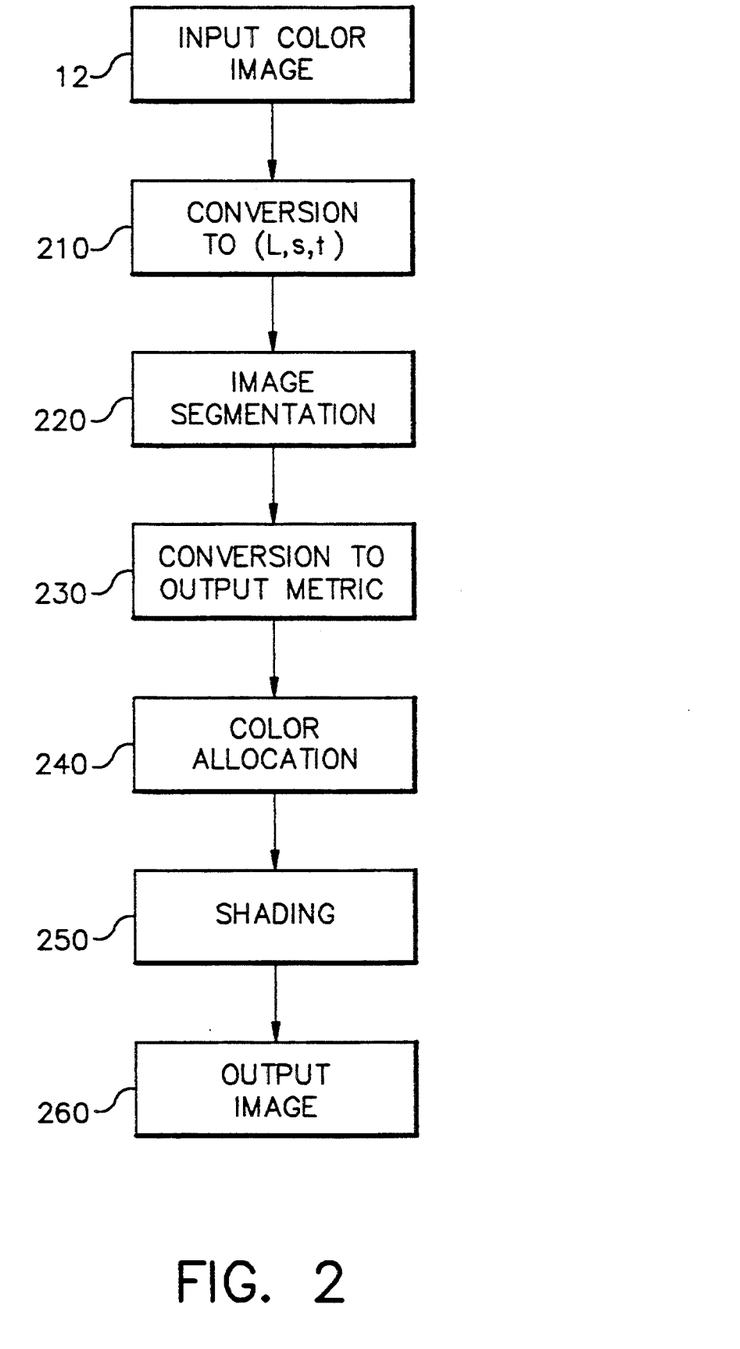
FIG. 2 is a block diagram representation of the method of the present invention.

Referring to FIG. 2 which is a block diagram that illustrates an implementation of the invention, the input color image 12 is first converted into an (L,s,t) color space in block 210, which will be explained later. The (L,s,t) image is then segmented into regions of different colors in block 220. Each image region corresponds roughly to an object. The next step, represented by block 230, is to determine how many colors should be allocated to an image region for coloring. In order to achieve good visual effect, the input image is converted into the output metric, block 230. For example, if the image is to be printed on paper, the output metric can be the Status A density. If the image is to be displayed on a monitor, then the image can be in gamma-corrected space to compensate for the non-linear distortion in the cathode-ray-tube. For each image region, the color-allocation algorithm computes indices that measures its dynamic range, busyness, area, and tone visibility. Based on these indices, the algorithm decides on the quota of colors that each image region is to be rendered. The color allocation is performed in the step color allocation, referenced as block 240. The shading algorithm then decides how an image region should be colored with its quota of colors as referenced by block 250 to then produce the output image of block 260.

The following describes the segmentation algorithm and the coloring algorithm in detail:

THE SEGMENTATION ALGORITHM

Figure 3:
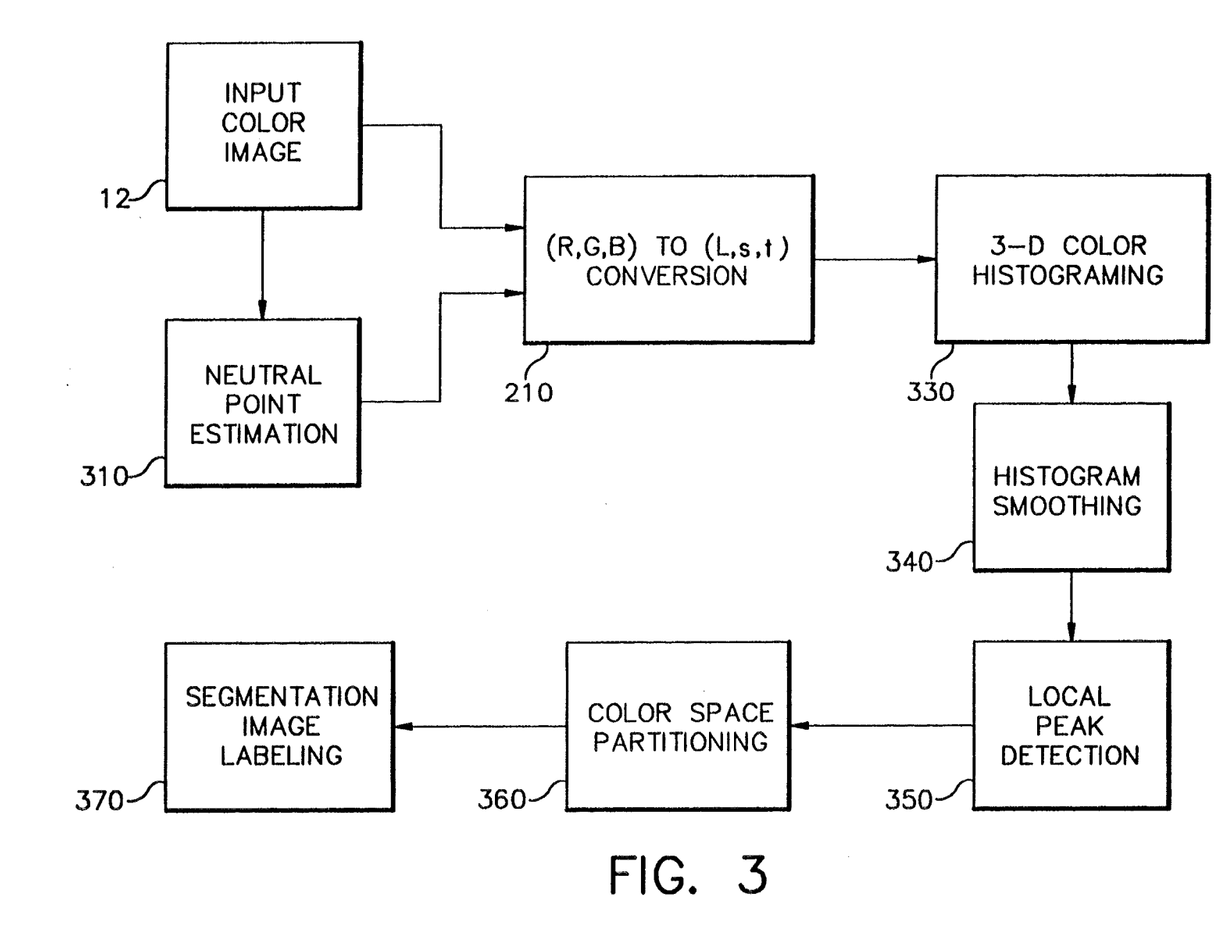
FIG. 3 is a block diagram representation of a segmentation algorithm.

FIG. 3 shows a block diagram of the segmentation algorithm. The input color image 12 is first calibrated to be in log exposure space. By definition R,G,B is the red, green, and blue log exposures of a pixel in the input image. A neutral point estimation is provided by block 310 as an input to the conversion block 210. The neutral point estimation algorithm can be implemented by any of the existing methods, such as the Large Area Transmission Densitometry (LATD), as described by R. M. Evans, U.S. Pat. No. 2,571,697, Oct. 16, 1951, or the Discriminatory Transmission Density, as described in "Automatic Color Printing Techniques" by J. Hughes and J. K. Bowker, Image Technology, PP. 39–43, Apr.-/May, 1969. In the current implementation, the LATD method is used. However, the segmentation result is not sensitive to the error in the estimation of the neutral point, based on the observations from many experimental tests. The luminance-chrominance space, (L,s,t,), is defined as:

$$L = \frac{1}{\sqrt{3}} (R + G + B)$$

$$s = \frac{1}{\sqrt{2}} (R - B)$$

$$t = \frac{1}{\sqrt{6}} (R - 2G + B).$$

The input color image is converted from the (R,G,B) space to the (L,s,t) space, in block 210, for the following reasons:

1. The two chrominance components, (s,t), are independent of variations in light-source intensity, i.e., a proportional increase in the red, green, and blue exposures by a constant factor does not change the (s,t) coordinates. For example, if the light source intensity is increased by a factor of two, then the values of the red log exposure, the green log exposure, and the blue log exposure will all be increased by the same amount, i.e., log 2=0.3010. Since the coefficients of R,G,B for s and t both sum up to zero, the values of s and t do not change. Furthermore, if the effect of changing surface orientation is mainly in changing the surface irradiance, the (s,t) components will only be weakly dependent on the lighting geometry (the specular highlight is one of the exceptions). As a result of this intensity-invariant nature, the (s,t) chrominance coordinates represent material types much better than the raw sensor signals, R,G,B.

2. The s component also captures the major portion of the variation of light source color temperature. For a daylight scene, surfaces are illuminated by direct sunlight and diffuse sky light. This mixture of illuminations of different spectral compositions tend to produce a wider spread of chrominance coordinates along the s (red-blue) direction than along the t (green-magenta) direction. Different weights can thus be applied to s and t to define color difference.

3. The luminance component, L, dominated by the variation of surface orientation and illumination gradient, can be discounted by giving it a smaller weighting factor when computing color difference between two pixels.

Once the input color image 12 has been converted into the (L,s,t) space, a three-dimensional histogram in that space is accumulated for the entire image as reflected by block 330. The 3-D color histogram in the (L,s,t) space for the input color image is constructed by quantizing the luminance-axis, L, into 32 bins, with a quantization interval of 0.1732. It is found that 100 bins for the s-axis and 100 bins for the t-axis are sufficient to cover most color gamuts. The quantization interval is 0.02 for s and t. The image segmentation is achieved by partitioning the 3-D color histogram. First, the histogram is smoothed by a $3 \times 3 \times 3$ convolution kernel with the following coefficients in block 340:

```
0 1 0    1 2 1    0 1 0
1 2 1    2 4 2    1 2 1
0 1 0    1 2 1    0 1 0
```

The smoothed histogram is divided by 28, the sum of all the coefficients in the smoothing kernel. The local maxima (peaks) in the smoothed histogram are then detected in block 350.

Figure 4:
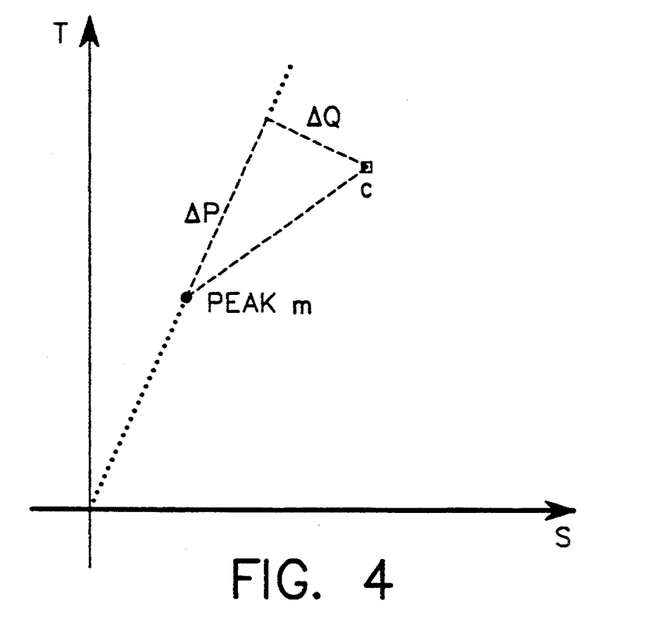
FIG. 4 is a chrominance component axes graph (t and s), illustrating the relationship of a color c to a peak m.

Referring to FIG. 4 in conjunction with FIG. 3, the local peaks, (for example, peak m) are used as the centers for clustering. The entire color histogram is then partitioned into separated volumes (one for each peak) in block 360 such that each point c in a volume has a shorter distance to the peak m in that volume than to any other peaks. (The meaning of "shorter distance" will be discussed below.) Each pixel in the input color image is then labeled, in block 370, according to the volume that contains its color.

There are two major considerations in defining the color distance between a peak m and a color c:

1. The chrominance difference between m and c is a more reliable indicator of material change than the luminance difference. Therefore, the difference in chrominances should be weighted more in the computation of color distance than the difference in luminance.

2. Because of the presence of specular (or surface) reflection, the magnitudes of natural color variations tend to be larger along the saturation direction than along the hue direction. For example, specular highlight tends to reduce the color saturation to the point that highlight areas look almost white. Therefore the difference in saturation should be weighted less than that in hue because saturation variation often does not signal any change of material.

Referring to FIG. 4, the color distance between a color c and a peak m is defined as:

$$\text{distance}(c,m) = 2.0*(\Delta L)_{c-m}^2 + 0.5*(\Delta P)_{c-m}^2 + (\Delta Q)_{c-m}^2$$

where $(\Delta L)_{c-m}$, $(\Delta P)_{c-m}$, and $(\Delta Q)_{c-m}$ are the differences, between a color c and a peak m, in luminance, "saturation", and "hue", respectively, after they have been quantized into histogram bins. It should be noted that the above coefficients are dependent on the quantization intervals used in forming the 3-D color histogram. The definition of $(\Delta P)_{c-m}$ and $(\Delta Q)_{c-m}$ are as follows: If we connect each peak with the neutral point, we will form one radial line for each peak. The distance from any point, c, to a peak, m, is decomposed into two components: one parallel and the other perpendicular to the radial line of that peak. The parallel component is $(\Delta P)_{c-m}$ and the perpendicular, $(\Delta Q)_{c-m}$. Remember that we have quantized the luminance much coarser than the two chrominance components (0.1732 v.s. 0.02). The weighting factor 2.0 of $(\Delta L)_{c-m}^2$ still represents a significant discounting in the luminance difference. Appendix A, attached hereto, is a program listing for performing the segmentation portion of the present invention. This program is written in C language and is designed to run on a SUN workstation (SUN Microsystems).

The Coloring Algorithm

Once the input color image is segmented into regions, the coloring algorithm is used to render each image region with proper color and shades. Since we have only 256 colors (including the luminance and the chrominances) to color all the segmented image regions, the major decisions are (1) how to distribute them among the image regions? and (2) how to use the allocated number of colors to paint an image region? The method used to distribute color quota is called the color-allocation algorithm, and the method to render the image regions is called the shading algorithm.

The Color-Allocation Algorithm

After the input color image is segmented into regions of different colors, it is mapped through the tone reproduction curve of the output device. It is important that the number of colors allocated to an image region be determined on the output metric so that the limited number of colors can be used to the best visual effects. It should also be pointed out that image segmentation should be performed in the (L,s,t) color space, but not the output metric, because the physical signals used in segmentation should not be further distorted by the output tone-scale mapping.

Since the segmentation algorithm partitions the input color image according to color attributes (luminance and chrominances), all the pixels of an image region will have roughly similar colors. Furthermore, the color distribution in a region is most likely unimodal, i.e., no big gaps between colors. There are mainly four factors that have to be considered for the good rendering of an image region: (1) its dynamic range, (2) its busyness, (3) its area, and (4) its tone-scale visibility.

Firstly, if the luminance dynamic range of a region is large, it needs more luminance levels to render the details well. Secondly, quantization errors are less visible in a busy, textured, region than in a uniform region. If the image region consists of subtle, gradual shadings, it needs more luminance levels to avoid contouring. Thirdly, if the area of an image region is large, the contouring effect can be seen easily. It requires more levels of shades to look right. Fourthly, if the image region is too dark or too light on the tone scale curve, its details are lost in the reproduction process, and therefore, need not be rendered accurately.

The color-allocation algorithm computes an index for each of the above four factors and then combines them to produce a weighting factor for each image region. The number of colors allocated to an image region is proportional to its weighting factor.

The dynamic range, RANGE, of an image region is the difference between the maximum green log-exposure (or code value) and the minimum green log-exposure (or code value). The green signal is used in the present embodiments because it is closer to the visual luminance than the red or blue signal is. In order to reduce the effects of noise, the minimum and the maximum are determined above a threshold, for example, the histogram cell must contain more than 3 pixels. The busyness, BUSY, is measured by the standard deviation of the green log exposures (or code value) of the image region. The area, AREA, is simply the number of pixels in the image region. The tone-scale visibility, VISI, is determined by first mapping the averaged green log-exposure through the tone reproduction curve of the output device and then looking up its visibility measure in a tone-visibility table. The tone-visibility table provides a flexible means for optimizing the shading algorithm according to the characteristics of the output device. This tone-visibility table can either be determined by measuring the subjective luminance contrast between two consecutive brightness levels on the output device, or constructed by inference from statistical distribution of signals from the important objects, such as human faces. Another alternative is simply to use Weber's law to construct the table. For example, if the monitor 20 can produce 256 levels of gray (say, 0 to 255) and each level of gray gives luminance of $Y_l, l=0, \ldots, 255$, then the visibility of output level l can be computed as: Visibility(l)=$(Y_{l+1}-Y_{l-1})/Y_l$ for $l=1,\ldots,254$. Visibility (l=0) can be set equal to Visibility (l=1). Visibility (l=255) can be set equal to Visibility (l=254).

Let S be the number of image regions from the segmentation. S is limited by the segmentation algorithm to be less than 256. The weighting factor, $W_i$, of an image region, i, $1 \leq i \leq S$, is computed by the following formula:

$$W_i = (RANGE_i)*(AREA_i)*(VISI_i)/(BUSY_i).$$

The number of colors, $N_i$, initially allocated to image region i is:

$$N_i = (256 - S) * (W_i) / \left( \sum_{k=1}^{S} W_k \right) + 1.$$

The formula allocates at least one color to each segmented image region. $N_i$ is compared to $V_i$, the number of discrete green values in the image region i. If the region contains only 10 discrete values, there is no point to allocate more than 10 colors to it. The number of colors, $M_i$, that is actually allocated to an image region, thus, is always limited by its number of discrete values, $V_i$, i.e., $M_i \leq V_i$. The number of colors in excess of this limit, $N_i - V_i$, is given back to the pool of colors for re-distribution. The order of the re-distribution is from the larges area to the smallest and then starts from the largest region again until all 256 colors are used up. Regions which have been allocated as many colors as their number of discrete values are not allocated any additional colors.

The Shading Algorithm

Because subtle chromatic variations within an object surface are often ignored when an image is viewed this invention colors each image region with only one chromaticity, i.e., that of the peak cell in the color histogram. Alternatively, one can use the averaged chromaticity of the image region. Since the chromaticity is computed from the image region, the number of colors allocated to the region determines the number of luminance levels of that region.

Figure 5:
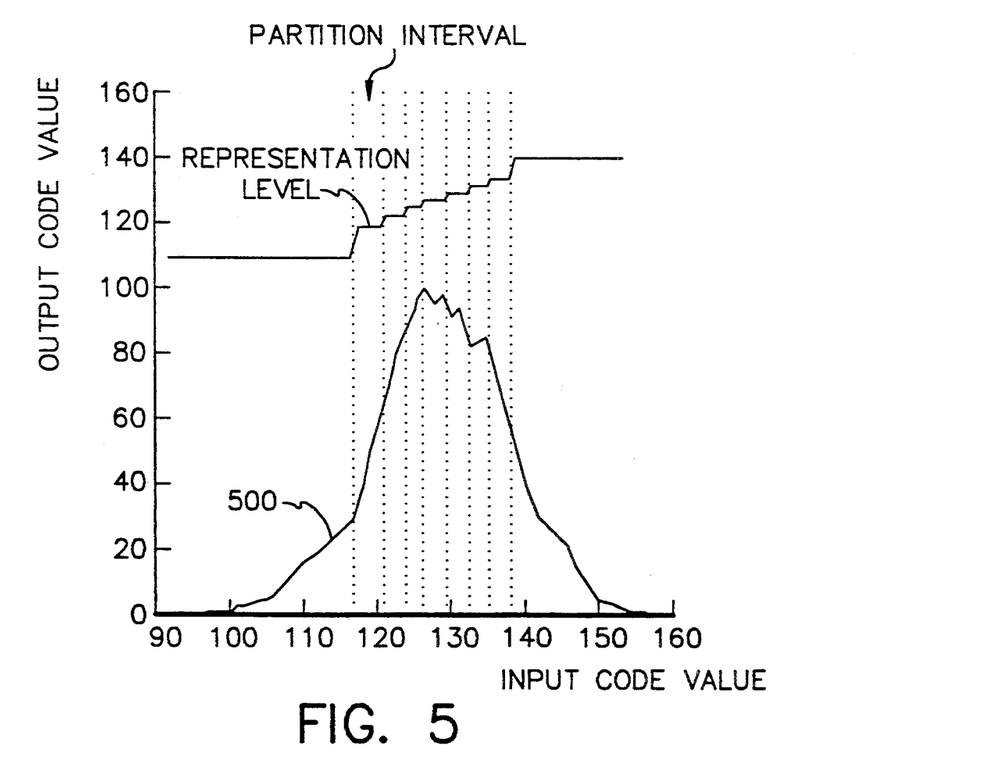
FIG. 5 is a chart illustrating a luminance histogram and the representation of the mean level for each of the partitions of the histogram.

Since there are only a few levels of luminance allocated to render the shadings, it is most important to use them to their best effect. An exact minimization of visual quantization errors requires precise specifications of the input and output devices, and a model of supra-threshold visual error model. For a specific application, this type of optimization should be performed to obtain the best results. Aiming at general applications, this invention uses a simple but relatively effective quantization method, which will be called the recursive partition method. The method is described as follows:

The histogram of the luminance (or green) signal of an image region i, is first accumulated. Let the total number of pixels in the image region be $P_i$. If we are to render the shading with $M_i$ output levels, we divide the total dynamic range of the image values into $M_i$ intervals, each contains $P_i/M_i$ pixels (this is called the partition size). Within each partitioned interval, its mean level is used as the representation level. FIG. 5 shows an example of how this is done. However, there is some complication in the digital implementation because one image value in the histogram may contain more than $P_i/M_i$ pixels in the region. If the partition size is fixed at $P_i/M_i$ pixels and if the pixels of the same image value are not to be mapped to different output levels, then there may not be $M_i$ intervals. In order to fully use the allocated $M_i$ levels, the algorithm reduces the partition size by 10% and repeats the partition process. If the $M_i$ levels are not used up, then the algorithm reduces the partition size again. Since $M_i$ is always less than or equal to the number of discrete values, $V_i$, in the histogram of the image region i, this recursive process is guaranteed to stop, with the minimum possible partition size equal to 1. Appendix B, attached hereto, is a program listing for performing the coloring portion of the present invention. This program is written in C language and is designed to run on a SUN workstation (SUN Microsystems).

While there has been shown what is considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

```
cptr = strrchr(aim,'.') + 1;
*cptr++ = 'a'; *cptr++ = 'i'; *cptr++ = 'm'; *cptr = '\0';

k = 0;
for(i = 0; i < MAXL; i++) par[i] = '\0';
/* sprintf(par, "%s", imginname);
for(i = 0; i < MAXL; i++) {
        if(par[i] == '/') {k = 0;}
          else {imgout[k++] = par[i];}
        } */
for(i = 0; i < MAXL; i++) imgout[i] = '\0';
sprintf(imgout, "%s", imginname);
cptr = strrchr(imgout,'.') + 1;
*cptr++ = 'l'; *cptr++ = 's'; *cptr++ = 'e'; *cptr++ = 'g'; *cptr = '\0';

sprintf(par, "%s", imgout);
cptr = strrchr(par,'.') + 1;
*cptr++ = 'l'; *cptr++ = 'p'; *cptr++ = 'e'; *cptr++ = 'a';
*cptr++ = 'k'; *cptr = '\0';

sprintf(histogram, "%s", imgout);
cptr = strrchr(histogram,'.') + 1;
*cptr++ = 'h'; *cptr++ = 'i'; *cptr++ = 's'; *cptr++ = 't'; *cptr = '\0';

/* printf("imgout= %s\naim= %s\npeak= %s\nhistogram_img= %s\n",imgout,
aim,par,histogram); */ if((fp= fopen(aim,"r")) == NULL) {
        printf("Cannot open %s\n", aim);
        exit(1);
        }
fscanf(fp, "%*s %d %d %d", &r0, &g0, &b0);
printf("rgb_transfer_densities: %d %d %d\n", r0, g0, b0);
fclose(fp);
if((fd= fopen(par,"w")) == NULL {
        printf("Cannot open %s\n", par);
        exit(1);
        } imgin=0;
ierr=opnimg(&imgin, imginname, inrwmode, inrandom);
if(ierr != SYSNRM) erroropen(imginname);
getdef(&imgin, &pixels, &lines, &bands, &imgintyp);

rbdim = 100; rbdim1 = rbdim - 1; rbdim2 = rbdim/2.0;
gmdim = 100; gmdim1 = gmdim - 1; gmdim2 = gmdim/2.0;
lumdim = 32; lumdim1 = lumdim-1; lumdim2 = lumdim/2.0;
rbgmdim = rbdim * gmdim;
thresh = 135;
/* thresh = 64; */ upixels=(unsigned int) pixels*lines;
tpixels = pixels * lines;
red = (unsigned char *) calloc(upixels, sizeof(char));
green = (unsigned char *) calloc(upixels, sizeof(char));
blue = (unsigned char *) calloc(upixels, sizeof(char));

lum = (unsigned char *) calloc(upixels, sizeof(char));
rb = (unsigned char *) calloc(upixels, sizeof(char));
gm = (unsigned char *) calloc(upixels, sizeof(char));

list_size = MAXP;
hist_size = rbdim * gmdim * lumdim;
hist = (int *) calloc((unsigned) hist_size, sizeof(int));
tmphist = (int *) calloc((unsigned) hist_size, sizeof(int));
h = hist;
for(i = 0; i < hist_size; i++) { *h++ = 0; } bufintyp = IDBYTE;
rdband(&imgin, 0, red, pixels, lines, bufintyp);
rdband(&imgin, 1, green, pixels, lines, bufintyp);
rdband(&imgin, 2, blue, pixels, lines, bufintyp);

rscale = 1.0/rslope;
gscale = 1.0/gslope;
bscale = 1.0/bslope;
for(i = 0; i < 256; i++) {
        rtable[i] = i * rscale;
        gtable[i] = i * gscale;
        btable[i] = i * bscale;
        }
rboff = r0 * rscale - b0 * gscale;
gmoff = r0 * rscale - 2.0 * g0 * gscale + b0 * bscale;
```

```
r = red; g = green; b = blue;
delta_l = 256.0 * sqrt((double) 3.0) / gslope / lumdim;
delta_s = 2.0; delta_t = 2.0;
lscale = 1.0 / sqrt((double) 3.0) / delta_l;
sscale = 1.0 / sqrt((double) 2.0) / delta_s;
tscale = 1.0 / sqrt((double) 6.0) / delta_t;

r = red; g = green; b = blue;
l = lum; s = rb; t = gm;
for(i = 0; i < tpixels; i++) {
        rr = rtable[*r++];
        gg = gtable[*g++];
        bb = btable[*b++];
        m = (int) (lscale * (rr + gg + bb));
        j = (int) (sscale * (rr - bb - rboff) + rbdim2);
        k = (int) (tscale * (rr + bb - gg - gg - gmoff) + gmdim2);
        if(m > lumdim1) m = lumdim1; if(m < 0) m = 0;
        if(j > rbdim1) j = rbdim1; if(j < 0) j = 0;
        if(k > gmdim1) k = gmdim1; if(k < 0) k = 0;
        *l++ = m; *s++ = j; *t++ = k;
        *(hist + m * rbgmdim + k * rbdim + j) += 1;
        } h = hist; th = tmphist;
for(m = 0; m < hist_size; m++) {*th++ = *h++;}

/* smooth the 3-D histogram by convolution with mask         */
mk = mask;
*mk++ = 0; *mk++ = 1; *mk++ = 0; *mk++ = 1; *mk++ = 2; *mk++ = 1;
*mk++ = 0; *mk++ = 1; *mk++ = 0; *mk++ = 1; *mk++ = 2; *mk++ = 1;
*mk++ = 2; *mk++ = 4; *mk++ = 2; *mk++ = 1; *mk++ = 2; *mk++ = 1;
*mk++ = 0; *mk++ = 1; *mk++ = 0; *mk++ = 1; *mk++ = 2; *mk++ = 1;
*mk++ = 0; *mk++ = 1; *mk++ = 0;

lc = hist;
cc = hist + rbgmdim + rbdim + 1;
nn = tmphist + rbgmdim + rbdim + 1;
conv_size = 3;
ioff = rbdim - conv_size;
conv1 = conv_size - 1;
inc = conv1 * rbdim;
for(m = 1; m < lumdim1; m++) {
        for(k = 1; k < gmdim1; k++) {
                for(j = 1; j < rbdim1; j++) {
                        if(*cc == 0) {cc++; *nn++ = 0; lc++; continue;}
                        mk = mask;
                        sum = 0; joff = 0;
                        for(ii = 0; ii < conv_size; ii++) {
                          ptr = lc + joff - ioff; joff += rbgmdim;
                          for(jj = 0; jj < conv_size; jj++) {
                            ptr += ioff;
                            for(mm = 0; mm < conv_size; mm++) {
                                sum += ((*mk++) * (*ptr++));
                                }
                            }
                          }
                        *nn++ = sum; lc++; cc++;
                        }
                lc += conv1; nn += conv1; cc += conv1;
                }
        lc += inc; nn += inc; cc += inc;
        } hist = tmphist;
/* find peaks in hist */
lc = hist;
cc = hist + rbgmdim + rbdim + 1;
inc = 2 * rbdim; kk = 0;
for(m = 1; m < lumdim1; m++) {
        for(k = 1; k < gmdim1; k++) {
                for(j = 1; j < rbdim1; j++) {
                        if(*cc < thresh) {cc++; lc++; continue;}
                        joff = 0; iflag = 1;
                        for(ii = 0; ii < conv_size; ii++) {
                          ptr = lc + joff - ioff; joff += rbgmdim;
                          for(jj = 0; jj < conv_size; jj++) {
                            ptr += ioff;
                            for(mm = 0; mm < conv_size; mm++) {
                                if(ptr == cc) {ptr++; continue;}
                                if(*ptr >= *cc) {iflag = 0;}
                                ptr++;
                                }
                            }
                          }
                        if(iflag == 1) {
```

```
                              kk++;
                              if(kk == list_size)
                                      {printf("too many peaks.\n"); exit(1);}
                              lpeak[kk] = m;
                              speak[kk] = j;
                              tpeak[kk] = k;
                              pcount[kk] = *cc/27;
/*                            printf("peak %d at %d %d %d has count= %d\n",
                                      kk, m, j, k, *cc/27); */
                              }
                      cc++; lc++;
                      }
              cc += conv1; lc += conv1;
              }
      cc += inc; lc += inc;
      }
npeak = kk; if(npeak == 0) {printf("npeak = 0, exit.\n"); exit(2);}
fprintf(fd, "number-of-peaks= %d\n",npeak);
fprintf(fd, "transfer_density= %d %d %d\n",r0, g0, b0);
fprintf(fd, "rgb_slopes= %f %f %f\n",rslope, gslope, bslope);
for(kk = 1; kk <= npeak; kk++) {
      m = lpeak[kk]; j = speak[kk]; k = tpeak[kk];
      fprintf(fd,"%d %d %d %d\n",m,j,k, pcount[kk]);
      }
fclose(fd);

for(kk = 1; kk <= npeak; kk++) {
      x = speak[kk] - rbdim2;
      y = tpeak[kk] - gmdim2;
      dist = sqrt((double) (x * x + y * y));
      if(dist > 0) { x /= dist; y /= dist;}
      peakx[kk] = x; peaky[kk] = y;
      }
h = hist;
maxdist = rbdim * rbdim + gmdim * gmdim + lumdim * lumdim;
wts = 0.5; /* this is the weighting factor for saturation distance */
wtl = 2.0; /* this is the weighting factor for luminance distance */
for(m = 0; m < lumdim; m++) {
      for(k = 0; k < gmdim; k++) {
              for(j = 0; j < rbdim; j++) {
                      if(*h == 0) {h++; continue;}
                      distmin = maxdist; pk = 0;
                      for(kk = 1; kk <= npeak; kk++) {
                              x = j - speak[kk];
                              y = k - tpeak[kk];
                              z = m - lpeak[kk];
                              d1 = x * peakx[kk] + y * peaky[kk];
                              xx = x - d1 * peakx[kk];
                              yy = y - d1 * peaky[kk];
                              dist = wtl*z*z + xx*xx + yy*yy + wts*d1*d1;
                              if(distmin > dist) {distmin = dist; pk = kk;}
                              }
                      if(pk == 0) printf("error pk-dist %f\n", dist);
                      *h++ = pk;
                      }
              }
      } for(kk = 1; kk <= npeak; kk++) {
      count[kk] = 0;
      mean[kk] = 0.0;
      } l = lum; s = rb; t = gm;
r = red; g = green; b = blue;
for(i = 0; i < tpixels; i++) {
      m = *l++; j = *s++; k = *t++;
      kk = hist[m * rbgmdim + k * rbdim + j];
      if(kk == 0) {g++; continue;}
      count[kk] += 1;
      mean[kk] += gtable[*g++];
      } for(kk = 1; kk <= npeak; kk++) {
      z = count[kk];
      mean[kk] /= z;
      } l = lum; s = rb; t = gm;
r = red; g = green; b = blue;
lscale = 1.0 / lscale;
sscale = 1.0 / sscale;
tscale = 1.0 / tscale;
```

```
s3 = 1.0 / 3.0;
s2 = 1.0 / 2.0;
s6 = 1.0 / 6.0;
offset = 128;

for(i = 0; i < 256; i++) {
        rtable[i] = (i-rbdim2) * sscale + rboff;
        gtable[i] = (i-gmdim2) * tscale + gmoff;
        btable[i] = (i) * lscale;
        }

/* this part produces the output segmented image in lum array */
/* the r,g,b array contains the colored segmentation image    */
index = lum;
for(i = 0; i < tpixels; i++) {
        m = *l++; j = *s++; k = *t++;
        kk = hist[m * rbgmdim + k * rbdim + j];
        if(kk == 0) {
                printf("pixel %d not labelled.\n",i);
                *r++ = 0; *g++ = 0; *b++ = 0; continue;
                }
        *index++ = kk;
        j = speak[kk];
        k = tpeak[kk];
        sv = rtable[j];
        tv = gtable[k];
        gg = mean[kk];
        rr = (sv + tv)/2.0 + gg;
        bb = (tv - sv)/2.0 + gg;
        rr = rr * rslope;
        gg = gg * gslope;
        bb = bb * bslope;
        if(rr < 0) rr = 0; if(rr > 255) rr = 255;
        if(gg < 0) gg = 0; if(gg > 255) gg = 255;
        if(bb < 0) bb = 0; if(bb > 255) bb = 255;
        *r++ = rr; *g++ = gg; *b++ = bb;
        } uvimg=0;
imgouttyp = IDBYTE;
putdef(&uvimg, pixels, lines, 3, imgouttyp);
ierr=opnimg(&uvimg, imgout, outrwmode, outrandom);
if(ierr != SYSNRM) erroropen(imgout);

buftyp = IDBYTE;
wrband(&uvimg,0,red,pixels,lines,buftyp);
wrband(&uvimg,1,green,pixels,lines,buftyp);
wrband(&uvimg,2,blue,pixels,lines,buftyp);
clsimg(&imgin);
clsimg(&uvimg);

cptr = strrchr(imgout,'.') + 1;
*cptr++ = 'i'; *cptr++ = 'n'; *cptr++ = 'd'; *cptr = '\0';
printf("index image: %s\n", imgout);
uvimg=0;
imgouttyp = IDBYTE;
index = lum;
putdef(&uvimg, pixels, lines, 1, imgouttyp);
ierr=opnimg(&uvimg, imgout, outrwmode, outrandom);
if(ierr != SYSNRM) erroropen(imgout);
buftyp = IDBYTE;
wrband(&uvimg,0,index,pixels,lines,buftyp);
clsimg(&uvimg);

} erroropen(imgname)      /*handle opnimg error: print message and quit*/
char imgname[];
{
fprintf(stderr,"cannot open image %s\n", imgname);
exit(0);
}
```

Appendix B

```
/* PROGRAM qtzvis.c  Hsien-Che Lee, 3/20/91                            */
/* object-oriented color image rendering on the segmented image        */
/* compile: cc -o qtzvis qtzvis.c -I/usr/local/include                 */
/*                -L/local/lib.'arch' -liopackagec -lm                 */ include <math.h>
include <stdio.h>
#include <string.h>
#include "/usr/local/include/iopackage.h"
```

```
define MAXL    80 main(argc,argv)
int     argc;
char    *argv[];
{
char    *calloc(), *cptr;
char    *imgin1, *imgin2, *imgoutname, par[80];
long    img1, img2, imgout, pixels,lines,bands,pixel,line,band;
long    ierr,imgintyp,imgouttyp,bufouttyp, bufintyp;
unsigned int    upixels, mp;
unsigned char   *red, *green, *blue, *r, *g, *b, *index, *id;
int     *table, dif, *slevel, *srange, range, min, max, ic, ip;
int     *discrete, count, rr, gg, bb, sum, sum1, kb;
int     rgdif[256], bgdif[256], rg, bg, mprob, iflag;
int     i, j, k, m, n, ii, jj, kk, nlevel, level, *hist;
int     i1, i2, ir, ig, ib, *rpeak, *gpeak, *bpeak, npeak, mt;
int     *tmptable, outcode[256], invcode[256], begin, di, is, ie;
float   cum, inc, var, std, stdsum, *pstd, mean;
float   ratio, vis[256], tmp, area;
int     inrwmode = 0, outrwmode = 1; /* 0 read; 1 write; 2 read-write */
int     inrandom = TRUE, outrandom = TRUE; /* FALSE: sequential */
FILE    *fopen(), *fp, *fd;

if(argc != 4)   {
        printf("Usage: qtzvis imgorg imgind outimage\n");
        exit(1);
        }
else
        {
        argv++;
        imgin1 = *argv++;
        imgin2 = *argv++;
        imgoutname = *argv++;
        } mprob = 1;
img1=0;
ierr=opnimg(&img1, imgin1, inrwmode, inrandom);
if(ierr != SYSNRM) erroropen(imgin1);
getdef(&img1, &pixels, &lines, &bands, &imgintyp);
printf("input image1 pixels=%d, lines=%d\n", pixels, lines);

img2=0;
ierr=opnimg(&img2, imgin2, inrwmode, inrandom);
if(ierr != SYSNRM) erroropen(imgin2);

getdef(&img2, &pixels, &lines, &band, &imgintyp);
printf("input image2 pixels=%d, lines=%d\n", pixels, lines);

imgout = 0;
imgouttyp = IDBYTE;
putdef(&imgout, pixels, lines, 3, imgouttyp);
ierr=opnimg(&imgout, imgoutname, outrwmode, outrandom);
if(ierr != SYSNRM) erroropen(imgoutname);

if((fd= fopen("scene8_paper.dat","r")) == NULL) {
        printf("Cannot open scene8_paper.dat\n");
        exit(1);
        }
for(i = 0; i < 256; i++) {
        fscanf(fd, "%*d %d",&outcode[i]);
        printf("incode %d outcode %d\n",i,outcode[i]);
        }
fclose(fd);
/* calculate the inverse table */
/* first determine the polarity of the table */
/* set k = -1 for positive table and k = -1 for negative table */
if(outcode[255] > outcode[0]) {k = 1; is = 0; ie = 255;}
        else {k = -1; is = 255; ie = 0;} for(i = 0; i < 256; i++) {
        iflag = 0;
        if(i >= outcode[ie]) {invcode[i] = ie; continue;}
        if(i <= outcode[is]) {invcode[i] = is; continue;}
        j = ie - k;
        while(iflag == 0) {
                if(outcode[j] >= i && outcode[j - k] < i) {
                        invcode[i] = j;
                        iflag = 1;
                        }
                        else {
```

```
                                j -= k;
                                if(j == is) iflag = 2;
                        }
                }
        for(i = 0; i < 256; i++) {
                printf("outcode= %d incode= %d\n",i,invcode[i]);
        } if((fd= fopen("visibility.dat","r")) == NULL) {
                printf("Cannot open visibility.dat\n");
                exit(1);
        }
        for(i = 0; i < 256; i++) {
                fscanf(fd, "%*d %f",&vis[i]);
                printf("outcode %d visibility %f\n",i,vis[i]);
        }
        fclose(fd);
        sprintf(par, "%s", imgin1);
        cptr = strrchr(par,'.') + 1;
        *cptr++ = 'l'; *cptr++ = 'p'; *cptr++ = 'e'; *cptr++ = 'a';
        *cptr++ = 'k'; *cptr = '\0';
        printf("parameter file: %s\n", par);

if((fd= fopen(par,"r")) == NULL) {
                printf("Cannot open %s\n", par);
                exit(1);
        }
        fscanf(fd, "%*s %d\n",&npeak);
        fscanf(fd, "%*s %*d %*d %*d\n");
        fscanf(fd, "%*s %*f %*f %*f\n");
        mp = npeak + 1;
        rpeak = (int *) calloc(mp, sizeof(int));
        gpeak = (int *) calloc(mp, sizeof(int));
        bpeak = (int *) calloc(mp, sizeof(int));
        slevel = (int *) calloc(mp, sizeof(int));
        srange = (int *) calloc(mp, sizeof(int));
        discrete = (int *) calloc(mp, sizeof(int));
        tmptable = (int *) calloc(256, sizeof(int));
        pstd = (float *) calloc(mp, sizeof(float));
        for(kk = 1; kk <= npeak; kk++) {
                fscanf(fd,"%d %d %d %d\n",&m,&j,&k,&i);
                rpeak[kk] = m; gpeak[kk] = j; bpeak[kk] = k;
        }
        fclose(fd);
        printf("npeak= %d\n", npeak);

upixels = (unsigned int) pixels * lines;
        red = (unsigned char *) calloc(upixels, sizeof(char));
        green = (unsigned char *) calloc(upixels, sizeof(char));
        blue = (unsigned char *) calloc(upixels, sizeof(char));
        index = (unsigned char *) calloc(upixels, sizeof(char));
        mt = mp * 256;
        table = (int *) calloc(mt, sizeof(int));
        bufintyp = IDBYTE; bufouttyp = IDBYTE;

rdband(&img1, 0, red, pixels, lines, bufintyp);
        rdband(&img1, 1, green, pixels, lines, bufintyp);
        rdband(&img1, 2, blue, pixels, lines, bufintyp);
        rdband(&img2, 0, index, pixels, lines, bufintyp);
        clsimg(&img1);

r = red; b = blue;
        g = green; id = index;
        /* mprob = 6;
        rg = rpeak[mprob] - gpeak[mprob];
        bg = bpeak[mprob] - gpeak[mprob];
        for(i = 0; i < 256; i++) {
                rgdif[i] = 0;
                bgdif[i] = 0;
        } */
        for(i = 0; i < upixels; i++) {
                k = *id++;
                ic = outcode[*g++];
                *(table + k * 256 + ic) += 1;
        }
        /* hist = table + mprob * 256;
        for(i = 0; i < 256; i++) {
                printf("hist[%d]= %d\n", i, hist[i]);
        } */

/* calculate std for each index and distribute # levels accordingly */
```

```
stdsum = 0.0;
for(k = 1; k <= npeak; k++) {
        sum = 0; sum1 = 0; var = 0.0;
        hist = table + k * 256;
        min = 0; max = 255; count = 0;
        for(i = 0; i < 256; i++) {
                j = hist[i]; if(j > 3) count++;
                if(j > 3 && min == 0) {min = i;}
                if(hist[255-i] > 3 && max == 255) max = 255 - i;
                sum += j;
                sum1 += i * j;
                var += i * i * j;
                }
        area = (float) sum / (float) upixels;
        mean = (float) sum1 / (float) sum;
        tmp = var/sum - mean*mean;
        if(tmp < 0.0) tmp = 0.0;
        std = sqrt((double) (tmp));
        range = max - min + 1;
        if(std == 0.0) std = 1.0;
        ip = gpeak[k];
        if(rpeak[k] > ip) ip = rpeak[k];
        if(bpeak[k] > ip) ip = bpeak[k];
        ic = outcode[ip];
        ratio = (float) range / std * vis[ic] * area;
        pstd[k] = ratio; srange[k] = range; discrete[k] = count;
        stdsum += ratio;
        } sum = 256;
for(k = 1; k <= npeak; k++) {
        i = (256 - npeak) * pstd[k] / stdsum + 1;
        if(i < 1) i = 1;
        if(i > discrete[k]) i = discrete[k];
        sum -= i;
        slevel[k] = i;
        }
for(k = 1; k <= npeak; k++) {
        printf("%d: initial level= %d\n", k, slevel[k]);
        } i = 1; count = 0;
while(sum > 0) {
        if(slevel[i] < discrete[i]) {
                slevel[i] += 1;
                sum -= 1; count++;
                }
        i += 1;
        if(i > npeak) {
                i = 1;
                if(count == 0) sum = -1;
                count = 0;
                }
        } for(k = 1; k <= npeak; k++) {
        printf("%d: range= %d weight= %f discrete= %d nlevel= %d\n",
                k, srange[k], pstd[k], discrete[k], slevel[k]);
        } sum = 0;
for(k = 1; k <= npeak; k++) {
        sum += slevel[k];
        } printf("total number of colors assigned= %d\n", sum);
count = 0;
for(k = 1; k <= npeak; k++) {
        sum = 0; cum = 0;
        nlevel = slevel[k];
        hist = table + k * 256;
        for(i = 0; i < 256; i++) { sum += hist[i]; }
        inc = (float) sum / (float) nlevel;
        if(inc < 1) inc = 1;
        level = 0;
        while(level < nlevel) {
           level = 1;
           /* assign level to each code and store it in tmptable */
           for(i = 0; i < 256; i++) {
                if(hist[i] == 0) continue;
                cum += hist[i]; iflag = 0;
                while(cum > inc) {cum = 0; iflag = 1;}
                if(iflag == 1) {level += 1;}
```

```
        if(level > nlevel) level = nlevel;
        tmptable[i] = level;
        }
    if(level < nlevel) {
        inc = inc * 9 / 10;
        for(i = 0; i < 256; i++) tmptable[i] = 0;
        }
    if(inc < 1) inc = 1;
    }
count += level;
/* within each quantization, compute the   */
/* population-weighted code value          */
level = tmptable[0]; il = 0;
for(i = 1; i < 256; i++) {
        if(level == tmptable[i]) {continue;}
        sum = 0; sum1 = 0;
        for(j = il; j < i; j++) {
                sum1 += hist[j]; sum += j * hist[j];}
        kb = (float) sum / (float) sum1 + 0.5;
        if(kb < il) kb = il;
        if(kb >= i) kb = i-1;
        for(j = il; j < i; j++) tmptable[j] = kb;
        il = i; level = tmptable[i];
        }
        /* finish the tail */
        sum = 0; sum1 = 0;
        for(j = il; j < 256; j++) {
                sum1 += hist[j]; sum += j * hist[j];
                }
        kb = (float) sum / (float) sum1 + 0.5;
        if(kb < il) kb = il;
        if(kb > 255) kb = 255;
        for(j = il; j < 256; j++) tmptable[j] = kb;
        for(i = 0; i < 256; i++) {
                j = outcode[i];
                il = tmptable[j];
                hist[i] = invcode[il];
                }
        }
printf("total number of colors used: %d\n", count);

r = red; g = green; b = blue; id = index;
for(i = 0; i < upixels; i++) {
        k = *id++;
        tmptable = table + k * 256;
        gg = tmptable[*g];
        dif = gg - gpeak[k];
        rr = rpeak[k] + dif;
        bb = bpeak[k] + dif;
        if(rr < 0) rr = 0; if(rr > 255) rr = 255;
        if(gg < 0) gg = 0; if(gg > 255) gg = 255;
        if(bb < 0) bb = 0; if(bb > 255) bb = 255;
        *r++ = rr; *g++ = gg; *b++ = bb;
        } wrband(&imgout, 0, red, pixels, lines, bufouttyp);
wrband(&imgout, 1, green, pixels, lines, bufouttyp);
wrband(&imgout, 2, blue, pixels, lines, bufouttyp);

clsimg(&imgout);
} erroropen(imgname)   /*handle opnimg error: print message and quit*/
char imgname[];
{
fprintf(stderr,"cannot open image %s\n", imgname);
exit(0);
}
```

I claim:

1. A method for displaying color images on a color display system with a limited number of simultaneously displayable colors comprising the steps of:

digitizing a color image to form an input image comprised of digital pixel values;

forming a multi-dimensional histogram of the digital pixel values;

detecting the peak values of the formed histogram and partitioning the histogram into separate volumes around each peak value;

segmenting the input image into image regions corresponding to the volumes of the partitioned histogram; and determining for each region an allocated number of colors for rendering each region such that the sum of all the allocated numbers of colors equals the limited number of displayable colors;

selecting from the limited number of displayable colors provided by the color display system the allocated number of colors to form a set of signals that when applied to the color display system will properly render the image.

2. The method according to claim 1 wherein the input color image is represented with R, G, and B signals corresponding to red, green, and blue log exposure components in an R, G, and B color space.

3. The method according to claim 2 wherein the histogram is formed by converting the R, G, and B signals to luminance and chrominance values in a luminance-chrominance color space.

4. The method according to claim 3 wherein the luminance-chrominance color space is an (L,s,t) color space where L is a weighted sum of R, G, and B signals, s is a function of $R-B$, and t is a function of $R-2G+B$.

5. The method according to claim 4 wherein the histogram is partitioned into separate volumes such that each point in a volume has a shorter distance to a peak value in that volume than to any other peak value in the histogram.

6. The method according to claim 3 wherein each image region has fewer chrominance values than luminance values with the total number of values equal to the allocated number of colors.

7. The method according to claim 6 wherein the rendering of each image region is further comprised of the steps of:
   forming a luminance histogram for each image region;
   partitioning the luminance histogram into a number of equally populated intervals wherein the number is equal to the allocated number of colors; and
   representing each interval by the average pixel value in the interval.

8. The method according to claim 1 wherein the allocation of the number of colors for each region is done according to a weighting factor computed for each image region based on its area, busyness, and dynamic range, wherein:
   area is the number of pixels;
   busyness is the standard deviation of the pixel values in each image region; and
   dynamic range is the difference between a maximum and a minimum pixel value in the image region.

9. A segmentation based rendition method for displaying color images on a color display with a limited number of simultaneously displayable colors comprising:
   digitizing a color image to form an input image comprised of R, G, and B pixel values representing the red, green and blue log exposure components of the color image;
   converting the formed R,G,B pixel values to luminance and chrominance values in a luminance-chrominance color space;
   forming a three-dimensional histogram of the luminance and chrominance values;
   smoothing the formed histogram by the use of a convolution kernel;
   detecting the peaks in the smoothed histogram;
   partitioning the formed histogram into separate volumes around each detected peak;
   segmentating the input image into regions corresponding to the volumes in the partitioned histogram;
   determining for each region an allocated number of colors for rendering each region such that the sum of all the allocated numbers of colors equals the limited number of displayable colors; and
   selecting from the limited number of displayable colors provided by the color display system the allocated number of colors to form a set of signals that when applied to the color display will properly render the displayed color image.

10. The method according to claim 9 wherein the luminance-chrominance color space is an (L,s,t) color space where L is a weighted sum of R, G, and B signals, s is a function of $R-B$, and t is a function of $R-2G+B$.

11. The method according to claim 9 wherein the histogram is partitioned into separate volumes such that each point in a volume has a shorter distance to a peak value in that volume than to any other peak value in the histogram.

12. The method according to claim 9 wherein each image region has fewer chrominance values than luminance values, with the total number of values equal to the allocated number of colors.

13. The method according to claim 12 wherein the allocation of the number of colors for each region is done according to a weighting factor computed for each image region based on its area, busyness, and dynamic range, wherein:
   area is the number of pixels;
   busyness is the standard deviation of the pixel values in each image region; and
   dynamic range is the difference between a maximum and a minimum pixel value in the image region.

14. The method according to claim 12 wherein the rendering of each image region is further comprised of the steps of:
   forming a luminance histogram for each image region;
   partitioning the luminance histogram into a number of equally populated intervals wherein the number is equal to the allocated number of colors; and
   representing each interval by the average pixel value in the interval.

* * * * *